United States Patent
Lee et al.

(10) Patent No.: US 11,410,413 B2
(45) Date of Patent: Aug. 9, 2022

(54) ELECTRONIC DEVICE FOR RECOGNIZING OBJECT AND METHOD FOR CONTROLLING ELECTRONIC DEVICE

(71) Applicant: Samsung Electronics Co., Ltd., Suwon-si (KR)

(72) Inventors: Dongkyu Lee, Suwon-si (KR); Yongwook Kim, Suwon-si (KR); Yongju Yu, Suwon-si (KR); Kiyoung Kwon, Suwon-si (KR); Jimin Kim, Suwon-si (KR); Chulkwi Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/274,282

(22) PCT Filed: Sep. 10, 2019

(86) PCT No.: PCT/KR2019/011715
§ 371 (c)(1),
(2) Date: Mar. 8, 2021

(87) PCT Pub. No.: WO2020/055097
PCT Pub. Date: Mar. 19, 2020

(65) Prior Publication Data
US 2022/0114802 A1    Apr. 14, 2022

(30) Foreign Application Priority Data

Sep. 10, 2018  (KR) .................. 10-2018-0107908

(51) Int. Cl.
*G06V 10/20*   (2022.01)
*G06V 10/60*   (2022.01)
(Continued)

(52) U.S. Cl.
CPC ............ *G06V 10/60* (2022.01); *G06V 10/255* (2022.01); *G06V 10/56* (2022.01); *G06V 40/20* (2022.01)

(58) Field of Classification Search
CPC ...... G06V 10/60; G06V 10/255; G06V 10/56; G06V 40/20; G06K 9/4661; G06K 9/3241; G06K 9/4652; G06K 9/00335
See application file for complete search history.

(56) References Cited

U.S. PATENT DOCUMENTS 7,444,006 B2   10/2008 Lin
9,092,861 B2   7/2015  Bennett et al.
(Continued)

FOREIGN PATENT DOCUMENTS

KR   10-2012-0114263 A    10/2012
KR      20150074646 A  *  7/2015
(Continued)

OTHER PUBLICATIONS

Translated version of KR-20150074646 (Year: 2015).*
(Continued)

*Primary Examiner* — Carol Wang
(74) *Attorney, Agent, or Firm* — Jefferson IP Law, LLP

(57) ABSTRACT

According to an embodiment of the disclosure, an electronic device may include a communication interface, a dynamic vision sensor (DVS) to generate bit data for each of a plurality of image frames, based on change in illuminance, a processor electrically connected with the communication interface and the DVS, and a memory electrically connected with the processor. The memory may store instructions, and the instructions may cause the processor to filter out at least a partial frame of the plurality of image frames, based on a ratio of the number of a bit value, which is included in the bit data and corresponds to each pixel, to the number of total
(Continued)

pixels constituting each of the plurality of image frames, and recognize a shape of a surrounding object of the electronic device, based on another frame of the plurality of image frames. Moreover, various embodiment found through the disclosure are possible.

15 Claims, 8 Drawing Sheets

(51) Int. Cl.
 *G06V 40/20* (2022.01)
 *G06V 10/56* (2022.01)

(56) References Cited

U.S. PATENT DOCUMENTS

| | | | |
|---|---|---|---|
| 9,118,912 | B2 | 8/2015 | Bhagavathy et al. |
| 9,934,557 | B2 | 4/2018 | Ji et al. |
| 10,341,641 | B2 | 7/2019 | Keh et al. |
| 2005/0031170 | A1 | 2/2005 | Lin |
| 2012/0224629 | A1 | 9/2012 | Bhagavathy et al. |
| 2013/0021491 | A1 | 1/2013 | Lee et al. |
| 2013/0021512 | A1 | 1/2013 | Patuck et al. |
| 2013/0022116 | A1 | 1/2013 | Bennett |
| 2014/0028861 | A1 | 1/2014 | Holz |
| 2016/0203614 | A1* | 7/2016 | Wang .................. G06V 10/147 382/103 |
| 2017/0084044 | A1 | 3/2017 | Keh et al. |
| 2017/0278221 | A1 | 9/2017 | Ji et al. |
| 2018/0342081 | A1* | 11/2018 | Kim ....................... G06T 7/254 |

FOREIGN PATENT DOCUMENTS

| | | | |
|---|---|---|---|
| KR | 10-1541384 B | | 8/2015 |
| KR | 10-1648208 B1 | | 8/2016 |
| KR | 10-2017-0035240 A | | 3/2017 |
| KR | 20170050293 A | * | 5/2017 |
| KR | 10-2017-0087814 A | | 7/2017 |
| KR | 10-2017-0110505 A | | 10/2017 |

OTHER PUBLICATIONS

Ahn, Eun Yeong, Jun Haeng Lee, Tracy Mullen, and John Yen. "Dynamic vision sensor camera based bare hand gesture recognition." In 2011 IEEE Symposium on Computational Intelligence for Multimedia, Signal and Vision Processing, pp. 52-59. IEEE, 2011. (Year: 2011).*

* cited by examiner

ELECTRONIC DEVICE FOR RECOGNIZING OBJECT AND METHOD FOR CONTROLLING ELECTRONIC DEVICE

CROSS-REFERENCE TO RELATED APPLICATION(S)

This application is a U.S. National Stage application under 35 U.S.C. § 371 of an International application number PCT/KR2019/011715, filed on Sep. 10, 2019, which is based on and claimed priority of a Korean patent application number 10-2018-0107908, filed on Sep. 10, 2018, in the Korean Intellectual Property Office, the disclosure of which is incorporated by reference herein in its entirety.

TECHNICAL FIELD

Embodiments of the disclosure relate to technologies of recognizing an object.

BACKGROUND ART

The technology of recognizing an object is based on image data collected by using an image sensor to recognize an object (e.g., a person, an animal, or a moving object). Various types of image sensors have been used for the technology of recognizing the object.

In the technology of recognizing the object, a dynamic vision sensor (DVS) has been used. The DVS may generate bit data for each of pixels constituting an image frame while corresponding to the change in intensity of light. For example, the DVS may record a bit value of '0' or '1' with respect to a pixel corresponding to the shape (or a boundary or a contour) of a moving object. In addition, the DVS may not separately record data values, with respect to pixels corresponding to a stationary surrounding background.

DISCLOSURE

Technical Problem

A device for recognizing, based on an image, an object may recognize the object by using an RGB image obtained through a frame-based vision sensor. A device for recognizing an object may recognize the object by extracting a feature of a plurality of layers included in an entire region or a specific region of an RGB image.

When a user is recognized by using an RGB image, because the feature of a physical body, such as a face or a body of the user, is extracted, the privacy of the user may be violated. The privacy issue may be more deepened when the RGB image including an image of the user is transmitted to a server for exact recognition.

The device for recognizing the object may recognize the user, by using a shape image (or a contour image) of the object, which is obtained through the DVS. In this case, as external lighting is changed or the electronic device is shaken, a large amount of incorrect bit data may be collected, thereby lowering an object recognizing rate. In addition, as the shape of a surrounding background object is collected as well as the shape of an object, such as a person or an animal, the privacy of the user may be violated.

Technical Solution

According to an embodiment of the disclosure, an electronic device may include a communication interface, a dynamic vision sensor (DVS) to generate bit data for each of a plurality of image frames, based on change in illuminance, a processor electrically connected with the communication interface and the DVS, and a memory electrically connected with the processor. The memory may store instructions, and the instructions may cause the processor to filter out at least a partial frame of the plurality of image frames, based on a ratio of the number of a bit value, which is included in the bit data and corresponds to each pixel, to the number of total pixels constituting each of the plurality of image frames, and recognize a shape of a surrounding object of the electronic device, based on another frame of the plurality of image frames.

Advantageous Effects

According to embodiments of the disclosure, the electronic device may recognize the object, on the basis of bit data for the shape of the object. The electronic device may partially exclude, depending on a preset condition, an image frame from a procedure of recognizing the object, when lighting is changed, thereby enhancing the accuracy in recognizing the object.

The electronic device may enhance the accuracy in recognizing the object, by partially removing the bit data, on the basis of information collected through the illuminance sensor or the motion sensor.

Besides, a variety of effects directly or indirectly understood through the disclosure may be provided.

DESCRIPTION OF DRAWINGS

In the following description made with respect to the accompanying drawings, similar components will be assigned with similar reference numerals.

MODE FOR INVENTION

Figure 1:
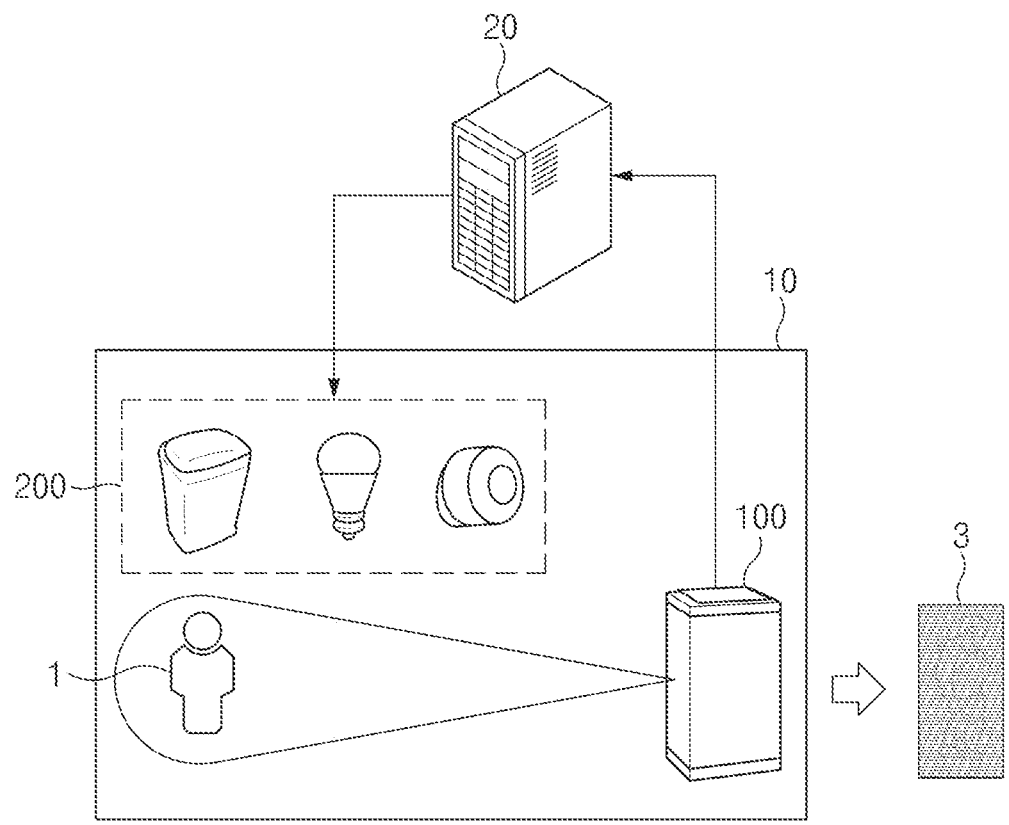
FIG. 1 is a view illustrating a system for recognizing an object, according to various embodiments.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

Hereinafter, a device for recognizing an object according to an embodiment of the present disclosure will be described with reference to the accompanying drawings. The term "user" used herein may refer to a person who uses the device for recognizing an object or may refer to a device (for example, an artificial electronic device) that uses the device for recognizing an object.

FIG. 1 is a view illustrating a system for recognizing an object, according to various embodiments.

Referring to FIG. 1, a device (or an electronic device) 100 for recognizing an object may recognize a user 1 in a specified place (e.g., home) 10, and may provide a specified service for the recognized user 1.

According to an embodiment, the device 100 for recognizing the object may recognize the user 1 through a vision sensor. According to an embodiment, the device 100 for recognizing the object may detect the user 1 through the vision sensor, and may generate an image 3 including the sensed user 1. According to an embodiment, the device 100 for recognizing the object may recognize the user 1 by using the generated image.

According to an embodiment, when finishing the recognition of the user 1, the device 100 for recognizing the object may provide a service corresponding to the recognized user 1. For example, the device 100 for recognizing the object may control an IoT device 200 to have a status set by the recognized user 1, or to perform a specified function. The IoT device 200 may be, for example, a device installed in the place (e.g., home) 10 at which the device 100 for recognizing the object is placed.

According to an embodiment, the device 100 for recognizing the object may provide the specified service through a cloud server 20. For example, the device 100 for recognizing the object may control the IoT device 200 through the cloud server 20 (e.g., an IoT cloud server). The device 100 for recognizing the object may transmit information (or control information) for controlling the IoT device 200 to the cloud server 20. The control information may include, for example, status information or movement information corresponding to the recognized user 1. The cloud server 20 may receive the control information and may transmit a command, which is based on the received control information, to the IoT device 200.

According to an embodiment, the device 100 for recognizing the object may be implemented in the form of various devices including the vision sensor. For example, the device 100 for recognizing the object may be a smartphone, a tablet PC, a desktop computer, a TV, or a wearable device, which includes the vision sensor. According to an embodiment, the device 100 for recognizing the object may be included in a security system or a smart home system.

Figure 2:
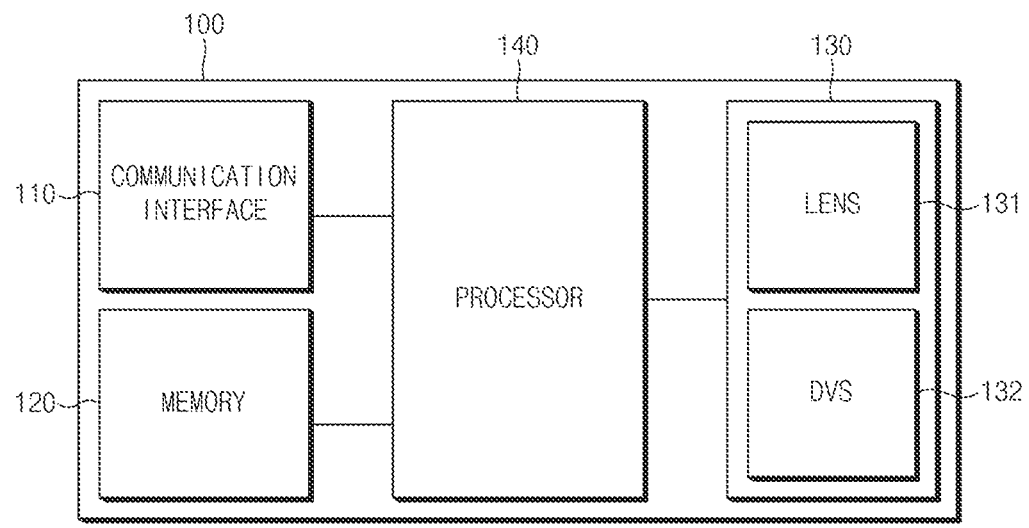
FIG. 2 is a block diagram illustrating a configuration of a device for recognizing an object, according to various embodiments.

FIG. 2 is a block diagram illustrating a configuration of the device 100 for recognizing an object, according to various embodiments.

Referring to FIG. 2, the device 100 for recognizing the object may include a communication interface 110, a memory 120, a dynamic vision sensor (DVS) module 130, and a processor (or at least one processor) 140.

According to an embodiment, the communication interface 110 may be connected with an external device to transmit or receive data. For example, the communication interface 110 may be connected with a cloud server (e.g., the cloud server 20 of FIG. 1) to receive data. For another example, the communication interface 110 may be connected with a user terminal to transmit or receive data. According to an embodiment, the communication interface 110 may include at least one of a wireless interface and a wired interface. The wireless interface may include, for example, Bluetooth, near field communication (NFC), or wireless-fidelity (Wi-Fi). The wired interface may include a local area network (LAN), a wide area network (WAN), or a plain old telephone service (POTS).

According to an embodiment, the memory 120 may include at least one database to store data. For example, the memory 120 may include a database to store an image generated by the device 100 for recognizing the object. According to an embodiment, the memory 120 may include a nonvolatile memory to store data. For example, the memory 120 may include a read-only memory (ROM), a flash memory, or a hard disk drive (HDD).

According to an embodiment, the DVS module 130 may collect bit data (hereinafter, referred to as "bit image data") constituting an image frame. The bit image data may include bit data, which is based on the comparison between an illuminance value of a previous image frame and an illuminance value of a current image frame, with respect to pixels constituting the image frame.

According to an embodiment, the DVS module 130 may include a lens 131 and a DVS 132.

According to an embodiment, the lens 131 may transmit light, which is reflected from the object, to the DVS 132. For example, the lens 131 may allow the light reflected from the object to be incident into the device 100 for recognizing the object and may transmit the light to the DVS 132.

According to an embodiment, the processor 140 may receive the bit image data output from the DVS module 130, and may recognize the object, based on the received bit image data.

According to an embodiment, the processor 140 may extract a feature from the image to identify the shape of the user. According to an embodiment, the processor 140 may determine a proposal region of the image generated, based on the extracted feature, and may refine a region of interest, which may include the shape of the user, of the determined proposal region. According to an embodiment, the processor 140 may identify the shape of the object included in the region of interest, by using a classification model to recognize a user. For example, the processor 140 may identify the shape of an object by using a support vector machine (SVM) classifier. According to an embodiment, the processor 140 may track the shape of the object included in a plurality of images.

According to an embodiment, the processor 140 may generate shape information for recognizing a specified user, based on the shape information of the identified object. For example, the processor 140 may extract a feature from the identified shape and may generate the shape information for recognizing the specified user, based on the extracted feature.

According to an embodiment, the processor 140 may recognize the specified user by using the generated shape information. For example, the processor 140 may recognize the specified user, which is included in the image, by using the generated shape information.

According to another embodiment, the processor 140 may generate the shape information, which is for recognizing the specified user, through the cloud server (or an external server). The processor 140 may transmit the generated image to the cloud server through the communication interface 110 and may receive the generated shape information from the cloud server. The cloud server may perform an operation similar to an operation for the processor 140 to generate the shape information. The cloud server may generate the shape information for recognizing the user by learning the shape of the object included in the image generated under a specified condition.

According to an embodiment, the processor 140 may provide the service for the recognized user. For example, the processor 140 may control at least one IoT device (e.g., the IoT device 200 of FIG. 1), depending on the recognized user. For example, the processor 140 may control the at least one IoT device to have a specified status depending on the recognized user, or to perform a specified operation. According to an embodiment, the processor 140 may control the at least one IoT device through the cloud server (e.g., the cloud server 20 of FIG. 1).

Figure 3:
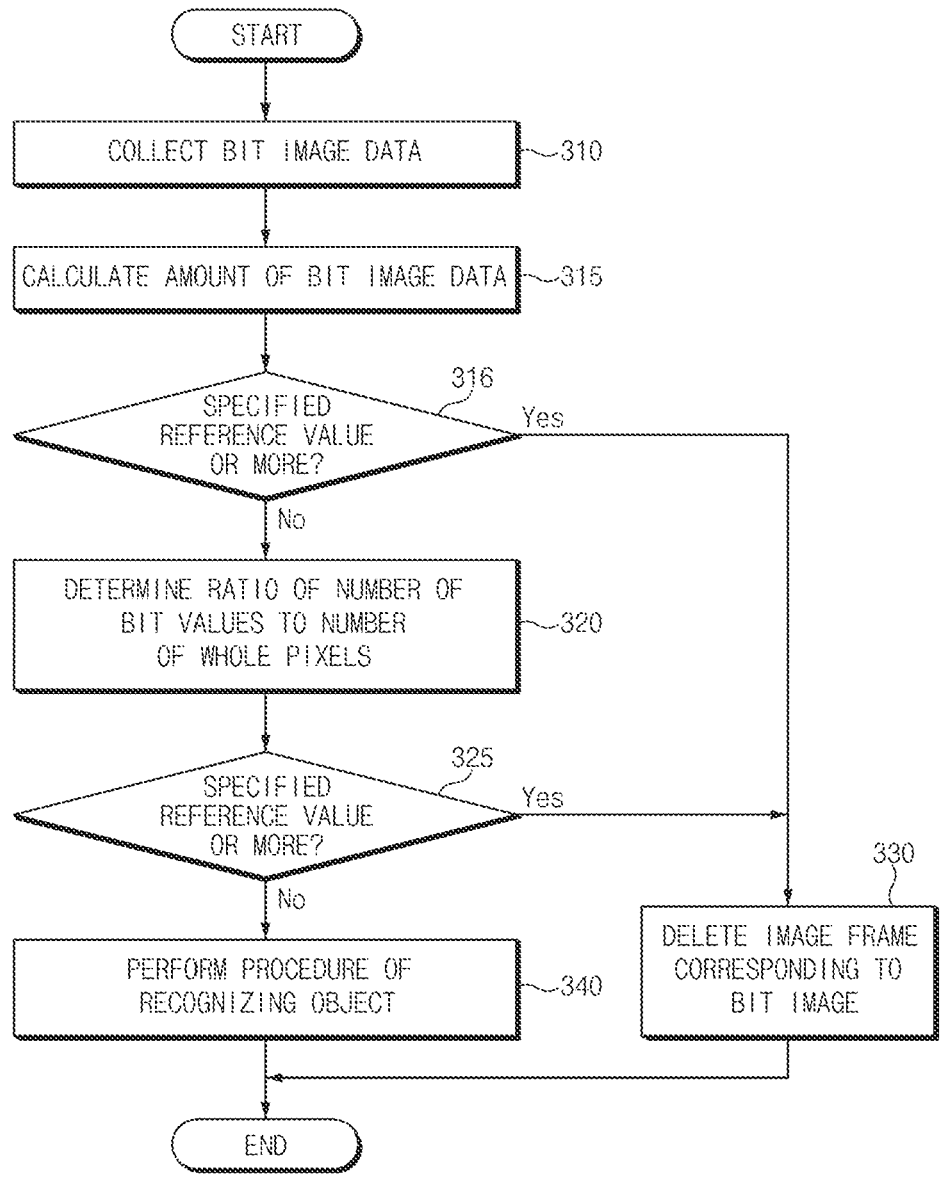
FIG. 3 is a flowchart illustrating a method for recognizing an object, depending on the change in surrounding illuminance of an electronic device, according to various embodiments.

FIG. 3 is a flowchart illustrating a method for recognizing an object, depending on the change in surrounding illuminance of an electronic device, according to various embodiments.

Referring to FIG. 3, in operation 310, the processor 140 may collect bit image data (or bitmap) constituting an image frame by using the DVS module 130. The bit image data may include bit data, which is obtained by comparing an illuminance value of a previous image frame with an illuminance value of a current image frame, with respect to each of pixels constituting the image frame.

For example, the pixels constituting the DVS module 130 record illuminance values (e.g., voltage values depending on illuminance) at a first time.

Thereafter, when an illuminance value recorded at a second time is increased by more than a first threshold value (e.g., 10 Lux) from the illuminance value recorded at the first time in each of the pixels, the DVS module 130 may record the bit value of '1' with respect to the relevant pixel.

Thereafter, when the illuminance value recorded at the second time is decreased by more than a second threshold value (e.g., 10 Lux) from the illuminance value recorded at the first time in each of the pixels, the DVS module 130 may record the bit value of '0' with respect to the relevant pixel.

The DVS module 130 may not separately record the bit value with respect to a pixel which has no change in illuminance value or is changed by less than the first threshold value or less than the second threshold value.

According to an embodiment, the first threshold value and the second threshold value may be set to equal values (e.g., 10 Lux) or set to mutually different values (e.g., the first threshold value set to 10 Lux, and the second threshold value set to 15 Lux).

According to an embodiment, the DVS module 130 may sequentially read the pixel values out of pixels having the bit values and may send the read-out results to the processor 140. The processor 140 may generate the bit image data, based on the stream of the received bit values, and may store the generated bit image data in the memory.

According to another embodiment, the DVS module 130 may provide, to the processor 140, information on coordinates of a pixel having a bit value and bit image data for recording the bit value.

According to various embodiments, in operation 315, the processor 140 may calculate an amount of bit image data, which is collected for a specified time (e.g., 300 ms), or an amount of bit image data corresponding to the specified number of consecutive frames. The processor 140 may determine whether to perform a procedure of recognizing the object, based on the calculated amount of bit image data.

In operation 316, the processor 140 may determine whether the amount of bit image data is equal to or greater than a reference data value (or exceeds the reference data value). When the amount of bit image data is equal to or greater than the reference data value (or exceeds the reference data value), the processor 140 may not perform the procedure of recognizing the object, with respect to relevant frames (operation 330).

According to an embodiment, when a specified reference proportion (70%) of the total pixels of a bit stream image has bit values, the processor 140 may not perform the procedure of recognizing the object with respect to the relevant frame.

For example, regarding bit image data having the resolution corresponding to VGA (640*480), when a bit stream image of three frames is collected for 300 ms, and when the bit stream image satisfies the condition of the reference proportion (70%), the processor 140 may determine whether an amount of the bit image data of three frames is equal to or greater than (or exceeds) 645,120 bits (e.g., 645,120 bits=(640×480)×1 bit×3 frame×0.7)). The processor 140 may not perform the procedure of recognizing the object, with respect to the three frames exceeding 645,120 bits.

In operation 320, the processor 140 may determine the ratio of the number of bit values to the number of the total pixels, in the bit image data. For example, the processor 140 may calculate the number (N1) of bit values of '1s' to the number (Nt) of the total pixels and may determine a first ratio ((N1/Nt)*100) with respect to pixels which are brightened. For example, the processor 140 may calculate the number (N0) of bit values of '0s' to the number (Nt) of the total pixels and may determine a second ratio ((N0/Nt)*100) with respect to pixels which are darkened.

In operation 325, the processor 140 may determine whether the ratio of the number of bit values to the number of the total pixels is equal to or greater than (exceeds) a specified reference value.

In operation 330, when the ratio of the number of bit values to the number of the total pixels is equal to or greater than (or exceeds) the specified reference value, the processor 140 may delete (hereinafter, "filter out") an image frame corresponding to the bit image data.

For example, when the first ratio ((N1/Nt)*100) for the pixels, which are brightened, in the bit image data is equal to or greater than a first reference value (e.g., 95%), the processor 140 may determine the bit values as being changed due to a light source added, instead of determining the bit value as being changed due to the movement of the object, and may filter out an image frame corresponding to the bit image data.

For example, when the second ratio ((N0/Nt)*100) for the pixels, which are darkened, in a bit image data is equal to or greater than a second reference value (e.g., 95%), the processor 140 may determine the bit values as being changed due to the light source turned off, instead of determining the bit value as being changed due to the movement of the object, and may filter out the image frame corresponding to the bit image data.

According to an embodiment, the first reference value and the second reference value may be set to equal values (e.g., 95%) or to mutually different values (e.g., the first reference value set to 95%, and the second reference value set to 80%).

According to an embodiment, the first reference value and the second reference value may be set, based on at least one of the characteristic (e.g., sensitivity to contrast) of the DVS, the status (e.g., the execution status of the application, a temperature, or a residual battery level) of the electronic device 100, or the surrounding status (e.g., an average illuminance value or a change width of illuminance) of the electronic device 100. The first reference value and the second reference value may be set to preset values or values dynamically changed.

In operation 340, when the ratio of the number of the bit values to the number of the total pixels is less than (or equal to or less than) the reference value, the procedure of recognizing the object may be performed, based on the bit image data.

For example, when the first ratio ((N1/Nt)*100) for the pixels, which are brightened, in the bit image data is less than the first reference value (e.g., 95%), and when the second ratio ((N0/Nt)*100) for the pixels, which are darkened, in the bit image data is less than the second reference value (e.g., 95%), the processor 140 may determine the bit values as being changed due to the movement of the object, may store the bit image data in the database, or may compare the bit image data with information stored in the database. Alternatively, the processor 140 may transmit the bit image data to the external server, through the communication interface 110.

The processor 140 may remove the bit image data having a bit value changed, as a light is turned on/off, thereby increasing the rate of recognizing the object, and thereby reducing computational processing such that power consumption is reduced.

Figure 4:
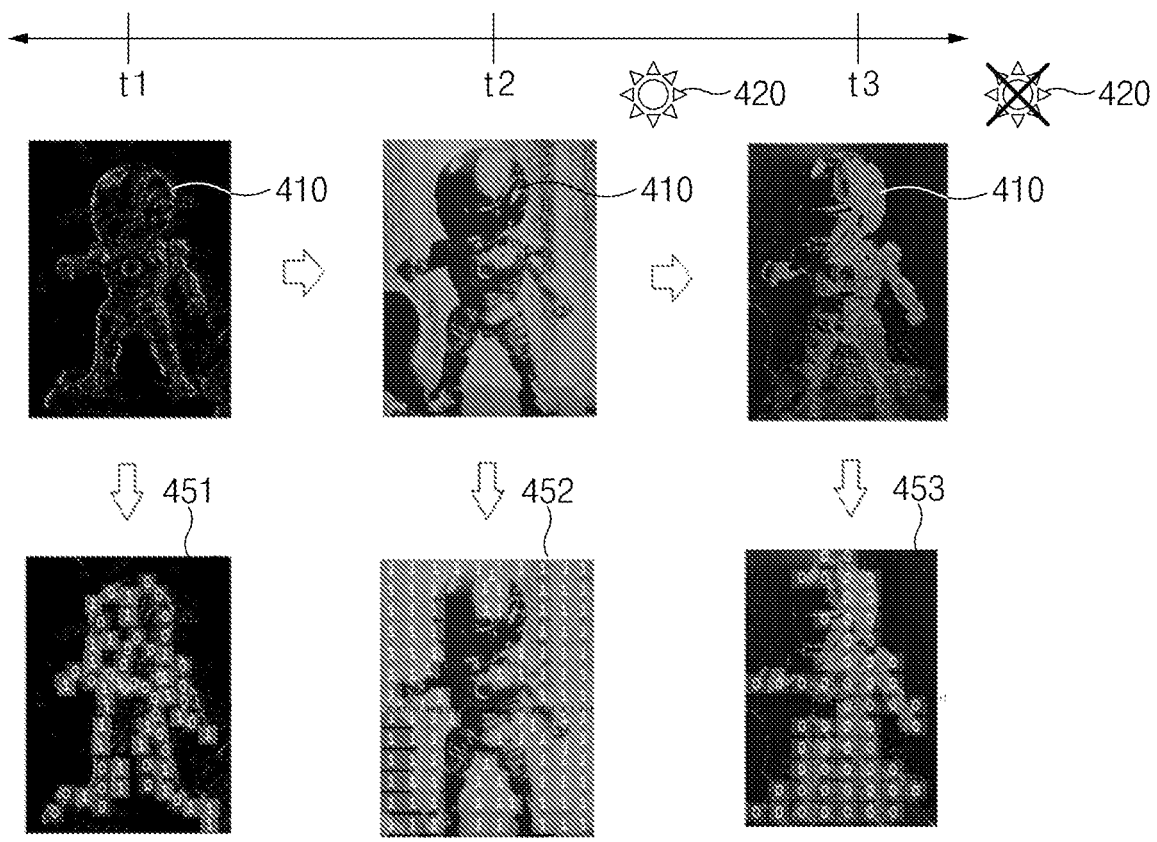
FIG. 4 is a view illustrating an object recognized depending on the change in surrounding illuminance, according to various embodiments.

FIG. 4 is a view illustrating an object recognized depending on the change in surrounding illuminance, according to various embodiments.

Referring to FIG. 4, the processor 140 may collect bit image data by using the DVS module 130. The bit image data may include bit data, which is obtained by comparing an illuminance value of a previous image frame with an illuminance value of a current image frame, with respect to each pixel constituting the image frame. The DVS module 130 may record bit values with respect to pixels corresponding to the shape of an object, while corresponding to the movement of the object, in the status that lighting is not changed. For example, the DVS module 130 may record the bit value of '1' with respect to a pixel having an illuminance value increased by the first threshold value (e.g., 10 Lux) or more from the illuminance value of the previous image frame, and may record the bit value of '0' with respect to a pixel having an illuminance value reduced by the second threshold value (e.g., 10 Lux) from the illuminance value of the previous image frame. According to an embodiment, the first threshold value and the second threshold value may be set to equal values (e.g., 10 Lux) or to mutually different values (e.g., the first threshold value set to 10 Lux, and the second threshold value set to 15 Lux).

The DVS module 130 may not separately record a coordinate value or a bit value with respect to a pixel having no change in illuminance value or a pixel having an illuminance value changed to be less than the first threshold value or less than the second threshold value.

The DVS module 130 may generate first bit image data 451, the pixel of which is marked as one of '1', '0', or 'no data', while corresponding to the movement of an object 410 at a first time 't1'. The processor 140 may determine the ratio of the number of the bit values to the number of the total pixels in the first bit image data 451.

For example, when the first ratio ((N1/Nt)*100) for a pixel (a pixel having the bit value of '1'), which is brightened by a specified illuminance value or more, in the first bit image data 451, is less than the first reference value (e.g., 95%), and when the second ratio ((N0/Nt)*100) for the pixel, which is darkened by the specified illuminance value or more, in the first bit image data 451 is less than 95%, the processor 140 may determine the bit value as being changed due to the movement of the object.

The processor 140 may perform the procedure of recognizing the object, based on the first bit image data 451. The processor 140 may store the first bit image data 451 in the database or may compare the first bit image data 451 with information stored in the database. Alternatively, the processor 140 may transmit the first bit image data 451 to the external server, through the communication interface. The first bit image data 451 is not the RGB image, and does not include an image for a surrounding environment, which is advantageous in privacy protection.

The DVS module 130 may generate second bit image data 452, the pixel of which is marked as one of '1', '0', or 'no data', at a second time 't2'. In the second bit image data 452, pixels having the bit value of '1' may be more sharply increased by a light source 420, when compared to the first bit image data 451. In the second bit image data 452, the change in the bit value, which results from the movement of the object 410, may not be actually reflected. The processor 140 may determine the ratio of the number of the bit values of '1s' to the number of the total pixels in the second bit image data 452.

For example, when the first ratio ((N1/Nt)*100) is equal to or greater than 95% with respect to a pixel having the bit value of '1' in the second bit image data 452, the processor 140 may determine the bit value as being changed due to the change in illuminance. The processor 140 may not separately perform the procedure of recognizing the object, based on the second bit image data 452 (filtering out).

According to an embodiment, the processor 140 may request a device driver terminal, which is to process data collected by the DVS module 130, not to process the second bit image data 452.

The DVS module 130 may generate third bit image data 453, the pixel of which is marked as one of '1', '0', or 'no data', at a third time 't3'. In the third bit image data 453, pixels having the bit value of '0' may be more sharply increased, as the light source 420 is turned off, when compared to the first bit image data 451 or the second bit image data 452. In the third bit image data 453, the change in the bit value, which results from the movement of the object 410, may not be actually reflected. The processor 140 may determine the ratio the number of the bit values of '0s' to the number of the total pixels, in the third bit image data 453.

For example, when the second ratio ((N0/Nt)*100) for the pixels having the bit values of '0s' is equal to or greater than 95% in the third bit image data 453, the processor 140 may determine the bit values as being changed due to the change in illuminance. The processor 140 may not separately perform the procedure of recognizing the object, on the basis of the third bit image data 453 (filtering out).

According to an embodiment, the processor 140 may request a device driver terminal, which is to process data collected by the DVS module 130, not to process the third bit image data 453.

Figure 5:
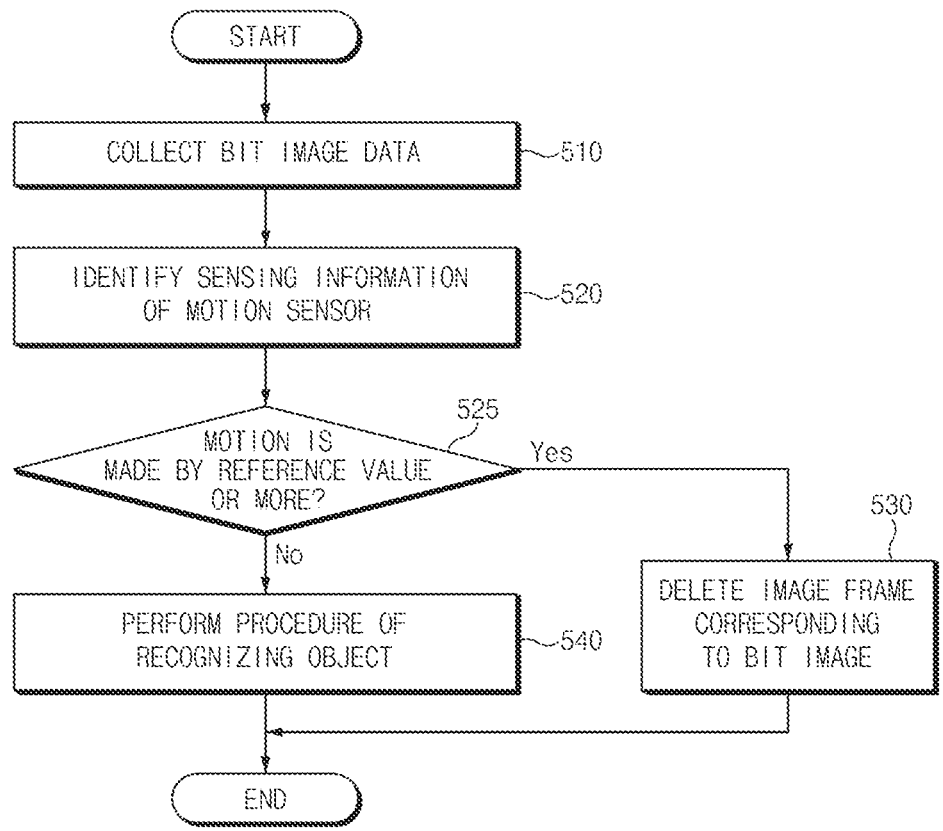
FIG. 5 is a flowchart illustrating a method for recognizing an object by using a motion sensor, according to various embodiments.

FIG. 5 is a flowchart illustrating a method for recognizing an object using a motion sensor, according to various embodiments.

Referring to FIG. 5, the processor 140 may sense the motion of the device 100 for recognizing the object, by using the motion sensor. The processor 140 may not reflect collected bit image data in the procedure of recognizing the object, by removing the bit image data when a bit value of the bit image data is changed due to the movement of the device 100 for recognizing the object.

In operation 510, the processor 140 may collect bit image data (or bitmap) by using the DVS module 130. The bit image data may include bit data, which is obtained by comparing an illuminance value of a previous image frame with an illuminance value of a current image frame, with respect to each pixel constituting the image frame.

In operation 520, the processor 140 may identify sensing information of the motion sensor for a time in which the bit image data is collected. The motion sensor may collect sensing information corresponding to the movement of the device 100 for recognizing the object. For example, the motion sensor may be a 3-axis sensor or a 6-axis sensor.

In operation 525, the processor 140 may determine, based on the sensing information of the motion sensor, whether a motion is made by a reference value or more in the device 100 for recognizing the object for the time in which the bit image data is collected.

In operation 530, when the motion is made by the specified reference value or more (more than the specified reference value) in the device 100 for recognizing the object for the time in which the bit image data is collected, the processor 140 may delete (filter out) an image frame corresponding the bit image data.

For example, the processor 140 may collect recognition values on the (x/y/z) axes of the 3-axis acceleration sensor. When at least one of the recognition values on the (x/y/z) axes of the 3-axis acceleration sensor exceeds a relevant sensing reference value for a specified time (e.g., 1 second), the processor 140 may determine the movement as being made in the device 100 for recognizing the object. The processor 140 may filter out an image frame corresponding to bit image data collected for the corresponding time, thereby enhancing the accuracy in recognizing the object.

In operation 540, when the motion is made by less than the specified reference value (by the specified reference value or less) in the device 100 for recognizing the object for the time in which the bit image data is collected, the processor 140 may perform the procedure of recognizing the object based on the image frame corresponding to the bit image data.

For example, the processor 140 may calculate an amount of the bit image data collected for a specified time (e.g., 300 ms) or may calculate an amount of bit image data for the specified number (e.g., three) of consecutive frames. When the amount of bit image data is equal to or greater than the reference data value (or exceeds the reference data value), the processor 140 may filter out relevant frames. In addition, when the ratio of the number of bit values to the number of the total pixels is equal to or greater than a specified reference value, the processor 140 may filter out an image frame corresponding to a relevant bit image data.

The processor 140 may store the bit image data in the database or may compare the bit image data with information stored in the database. Alternatively, the processor 140 may transmit the bit image data to the external server, through the communication interface.

Figure 6:
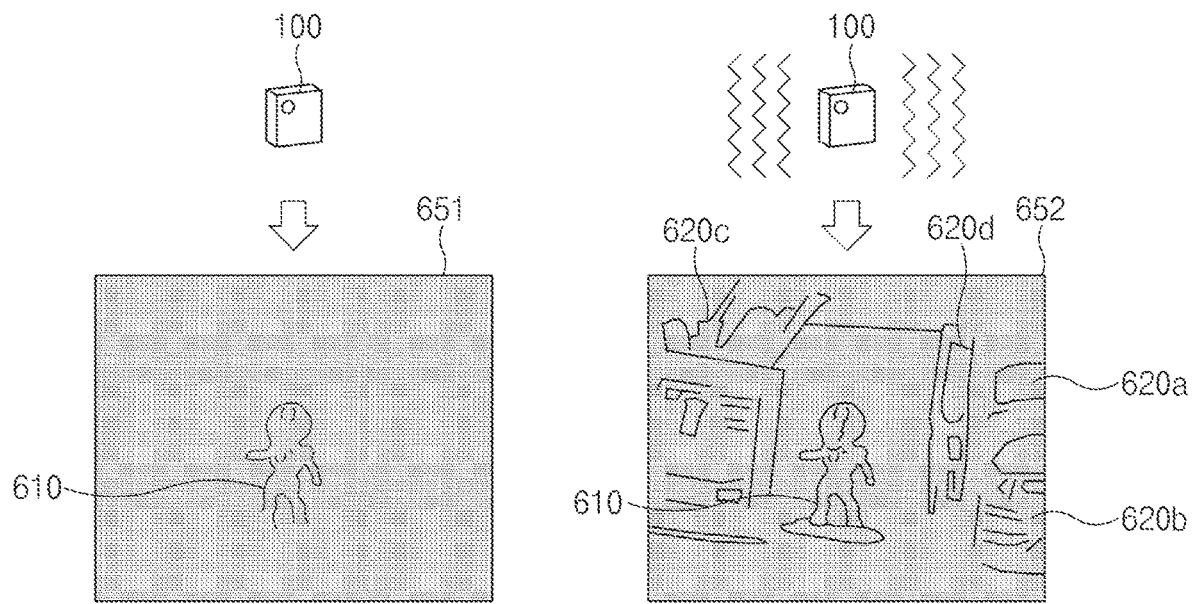
FIG. 6 is a view illustrating object recognition resulting from a motion sensed, according to various embodiments.

FIG. 6 is a view illustrating object recognition resulting from a motion sensed, according to various embodiments.

Referring to FIG. 6, the processor 140 may collect bit image data by using the DVS module 130. The bit image data may include bit data, which is obtained by comparing an illuminance value of a previous image frame with an illuminance value of a current image frame, with respect to each pixel constituting the image frame.

The DVS module 130 may record bit values, and generate bit image data 651, with respect to pixels corresponding to the shape of an object, which is made due to the movement of the object, in the status that movement of the device 100 for recognizing the object is not made. For example, the DVS module 130 may record the bit value of '1' with respect to a pixel having an illuminance value increased by the first threshold value (e.g., 10 Lux) or more from an illuminance value of the previous image frame, and may record the bit value of '0' with respect to a pixel having an illuminance value reduced by the second threshold value (e.g., 10 Lux) from the illuminance value of the previous image frame. According to an embodiment, the first threshold value and the second threshold value may have equal sizes. According to an embodiment, the first threshold value and the second threshold value may be set to equal values (e.g., 10 Lux) or to mutually different values (e.g., the first threshold value set to 10 Lux, and the second threshold value set to 15 Lux).

The DVS module 130 may not separately record a coordinate value or a bit value with respect to a pixel having no change in illuminance value or a pixel having an illuminance value changed to be a value less than the first threshold value or the second threshold value.

The DVS module 130 may generate first bit image data 651, the pixel of which is marked as one of '1', '0', or 'no data', depending on the movement of an object 610. The processor 140 may determine the ratio of the number of the bit values to the number of the total pixels in the first bit image data 651.

For example, when the first ratio ((N1/Nt)*100) for a pixel (a pixel having the bit value of '1'), which is brightened by a specified illuminance value or more in the first bit image data 651, is less than the first reference value (e.g., 95%), and when the second ratio ((N0/Nt)*100) for the pixel (a pixel having the bit value of '0'), which is darkened by the specified illuminance value or more, in the bit image data 651 is less than 95%, the processor 140 may determine the bit values as being changed due to the movement of the object 610.

The processor 140 may perform the procedure of recognizing the object, based on the first bit image data 651. The processor 140 may store the first bit image data 651 in the database or may compare the first bit image data 651 with information stored in the database. Alternatively, the processor 140 may transmit the bit image data 651 to the external server, through the communication interface.

The DVS module 130 may generate second bit image data 652, the pixel of which is marked as one of '1', '0', or 'no data', in the state that the movement of the device 100 for recognizing the object is made. As the device 100 for recognizing the object is moved, the second bit image data 652 may have the change in bit value at the contour of the object 610 and may have the change in bit value at the contours of surround background objects 620a to 620d.

In the second bit image data 652, the object may be erroneously recognized, when the change in bit values is reflected in the procedure of recognizing the object, as the bit values are changed due to the movement of the object 610 and the movement of the device 100 for recognizing the object. The processor 140 may not separately perform the procedure of recognizing the object, based on the second bit image data 652 (filtering out).

For example, the processor 140 may collect recognition values on the (x/y/z) axes of the 3-axis acceleration sensor, for the time in which the second bit image data 652 is collected. When at least one of the recognition values on the (x/y/z) axes of the 3-axis acceleration sensor exceeds a relevant sensing reference value, the processor 140 may determine movement as being made in the device 100 for recognizing the object while the second bit image data 652 is collected. The processor 140 may filter out the image frame corresponding to the second bit image data 652, thereby enhancing the accuracy in recognizing the object.

According to various embodiments, the processor 140 may allow a user to confirm the installation state of the device 100 for recognizing the object, through an alarm sound or a pop-up window, when the filtering-out is performed due to motions made at least a specified number of times (e.g., five times).

According to an embodiment, the processor 140 may request a device driver terminal, which is to process data collected by the DVS module 130, not to process the second bit image data 652.

Figure 7:
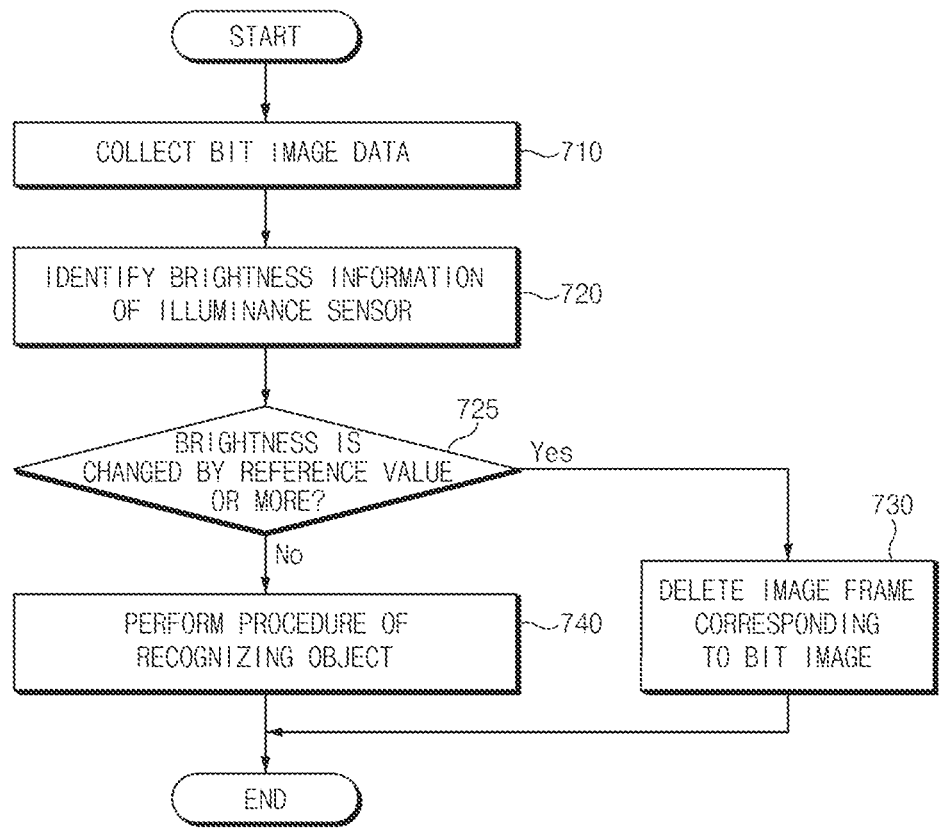
FIG. 7 is a flowchart illustrating a method for recognizing an object by using an illuminance sensor, according to various embodiments.

FIG. 7 is a flowchart illustrating a method for recognizing an object using an illuminance sensor, according to various embodiments.

Referring to FIG. 7, the processor 140 may sense the surrounding illuminance of the device 100 for recognizing the object, by using the illuminance sensor. The processor 140 may not reflect collected bit image data in the procedure of recognizing the object by removing the collected bit image data, when the bit value of the bit image data is changed due to the surrounding illuminance.

In operation 710, the processor 140 may collect the bit image data (or bitmap) by using the DVS module 130. The bit image data may include bit data, which is obtained by comparing an illuminance value of a previous image frame with an illuminance value of a current image frame, with respect to each pixel constituting an image frame.

In operation 720, the processor 140 may identify brightness information of the illuminance sensor for the time in which the bit image data is collected. The illuminance sensor may sense the surrounding brightness of the device 100 for recognizing the object and may collect brightness information corresponding to the surrounding brightness.

In operation 725, the processor 140 may determine, based on the brightness information of the illuminance sensor, whether the change in brightness is made by a specified reference value or more around the device 100 for recognizing the object, for the time in which the bit image data is collected.

In operation 730, when the change in brightness is made by the specified reference value (e.g., 10 lux) or more (or made by a value more than the specified reference value), for time in which the bit image data is collected, the processor 140 may delete (filter out) the image frame corresponding to the bit image data.

For example, the processor 140 may delete (filter out) the image frame corresponding to the bit image data collected while the illuminance is changed, when the surrounding illuminance is changed to 10 lux or more based on the brightness information of the illuminance sensor.

In operation 740, when the change in brightness is made by a value less than the specified reference value (e.g., 10 lux) (or made by a value equal to or less than the specified reference value), for the time in which the bit image data is collected, the processor 140 may perform the procedure of recognizing the object, based on the bit image data.

For example, the processor 140 may calculate an amount of bit image data collected for a specified time (e.g., 300 ms) or an amount of bit image data for the specified number (e.g., three) of consecutive frames. When the amount of bit image data is equal to or greater than the reference data value (or exceeds the reference data value), the processor 140 may filter out relevant frames. In addition, when the ratio of the number of bit values to the number of the total pixels is equal to or greater than a specified reference value, the processor 140 may filter out an image frame corresponding to a relevant bit image data.

The processor 140 may store the bit image data in the database or may compare the bit image data with information stored in the database. Alternatively, the processor 140 may transmit the bit image data to the external server, through the communication interface.

Figure 8:
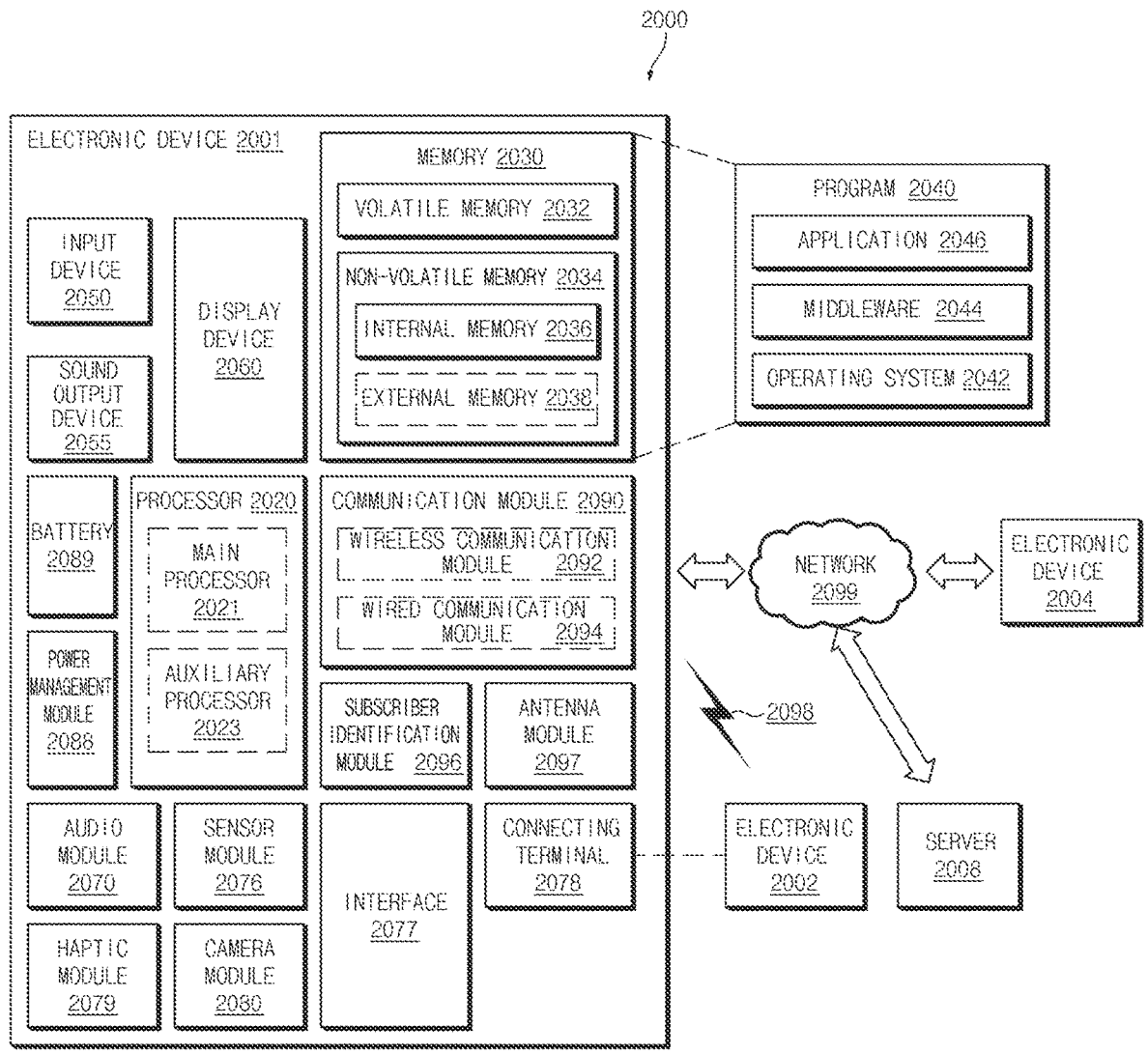
FIG. 8 is a block diagram illustrating an electronic device under a network environment, according to various embodiments.

FIG. 8 illustrates a block diagram of an electronic device 2001 (e.g., the electronic device 100 of FIG. 1) in a network environment 2000, according to various embodiments.

Referring to FIG. 10, the electronic device 2001 in the network environment 2000 may communicate with an electronic device 2002 over a first network 2098 (e.g., a short range wireless communication network) or may communicate with an electronic device 2004 or a server 2008 over a second network 2099 (e.g., a long distance wireless communication network). According to an embodiment, the electronic device 2001 may communicate with the electronic device 2004 through the server 2008. According to an embodiment, the electronic device 2001 may include a processor 2020, a memory 2030, an input device 2050, a sound output device 2055, a display device 2060, an audio module 2070, a sensor module 2076, an interface 2077, a haptic module 2079, a camera module 2080, a power management module 2088, a battery 2089, a communication module 2090, a subscriber identification module 2096, or an antenna module 2097. In any embodiment, at least one (e.g., the display device 2060 or the camera module 2080) of the components may be omitted from the electronic device 2001, or one or more other components may be further included in the electronic device 2001. In any embodiment, some of the components may be implemented with a single integrated circuit. For example, the sensor module 2076 (e.g., a fingerprint sensor, an iris sensor, or an illumination sensor) may be embedded in the display device 2060 (e.g., a display).

The processor 2020 may execute, for example, software (e.g., a program 2040) to control at least one other component (e.g., a hardware or software component) of the electronic device 2001 connected to the processor 2020, and may perform various data processing or operations. According to an embodiment, as at least a part of the data processing or operations, the processor 2020 may load a command or data received from any other component (e.g., the sensor module 2076 or the communication module 2090) to a volatile memory 2032, may process the command or data stored in the volatile memory 2032, and may store processed data in a nonvolatile memory 2034. According to an embodiment, the processor 2020 may include a main processor 2021 (e.g., a central processing unit or an application processor) and an auxiliary processor 2023 (e.g., a graphic processing device, an image signal processor, a sensor hub processor, or a communication processor), which may be operated independently of or together with the main processor 2021. Additionally or alternatively, the auxiliary processor 2023 may be configured to use lower power than the main processor 2021 or to be specialized for a specified function. The auxiliary processor 2023 may be implemented separately from the main processor 2021 or may be implemented as a part of the main processor 2021.

The auxiliary processor 2023 may control at least a part of a function or states associated with at least one component (e.g., the display device 2060, the sensor module 2076, or the communication module 2090) of the electronic device 2001, for example, instead of the main processor 2021 while the main processor 2021 is in an inactive (e.g., sleep) state and together with the main processor 2021 while the main processor 2021 is in an active (e.g., an application execution) state. According to an embodiment, the auxiliary processor 2023 (e.g., an image signal processor or a communication processor) may be implemented as a part of any other component (e.g., the camera module 2080 or the communication module 2090) which is functionally (or operatively) associated with the auxiliary processor 2023. The memory 2030 may store various data which are used by at least one component (e.g., the processor 2020 or the sensor module 2076) of the electronic device 2001. The data may include, for example, software (e.g., the program 2040), or input data or output data associated with a command of the software. The memory 2030 may include the volatile memory 2032 or the nonvolatile memory 2034.

The program 2040 may be stored in the memory 2030 as software, and may include, for example, an operating system 2042, a middleware 2044, or an application 2046.

The input device 2050 may receive a commands or data which will be used by a component (e.g., the processor 2020) of the electronic device 2001, from the outside (e.g., a user) of the electronic device 2001. The input device 2050 may include, for example, a microphone, a mouse, or a keyboard.

The sound output device 2055 may output a sound signal to the outside of the electronic device 2001. The sound output device 2055 may include, for example, a speaker or a receiver. The speaker may be used for a general purpose such as multimedia play or recording play, and the receiver may be used to receive an incoming call. According to an embodiment, the receiver may be implemented separately from the speaker or may be implemented as a part of the speaker.

The display device 2060 may visually provide information to the outside (e.g., the user) of the electronic device 2001. The display device 2060 may include, for example, a display, a hologram device, or a control circuit for controlling a projector and a corresponding device. According to an embodiment, the display device 2060 may include a touch circuitry configured to sense a touch, or a sensor circuitry (e.g., a pressure sensor) configured to measure the strength of force generated by the touch.

The audio module 2070 may convert sound to an electrical signal, or reversely, may convert an electrical signal to sound. According to an embodiment, the audio module 2070 may obtain sound through the input device 2050, or may output sound through the sound output device 2055, or through an external electronic device (e.g., the electronic device 2002) (e.g., a speaker or a headphone) directly or wirelessly connected with the electronic device 2001.

The sensor module 2076 may sense an operation state (e.g., power or a temperature) of the electronic device 2001 or an external environment state (e.g., a user state), and may generate an electrical signal or a data value corresponding the sensed state. According to an embodiment, the sensor module 2076 may include, for example, a gesture sensor, a grip sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 2077 may support one or more specified protocols that may be used to directly and wirelessly connect the electronic device 2001 with an external electronic device (e.g., the electronic device 2002). According to an embodiment, the interface 2077 may include, for example, a high definition multimedia interface (HDMI), a universal serial bus (USB) interface, a secure digital (SD) card interface, or an audio interface.

A connection terminal 2078 may include a connector that may allow the electronic device 2001 to be physically connected with an external electronic device (e.g., the electronic device 2002). According to an embodiment, the connection terminal 2078 may include, for example, a HDMI connector, a USB connector, a SD card connector, or an audio connector (e.g., a headphone connector).

The haptic module 2079 may convert an electrical signal to a mechanical stimulation (e.g., vibration or movement) or an electrical stimulation which the user may perceive through the sense of touch or the sense of movement. According to an embodiment, the haptic module 2079 may include, for example, a motor, a piezoelectric sensor, or an electrical stimulation device.

The camera module 2080 may photograph a still image and a video. According to an embodiment, the camera module 2080 may include one or more lenses, image sensors, image signal processors, or flashes (or electrical flashes).

The power management module 2088 may manage the power which is supplied to the electronic device 2001. According to an embodiment, the power management module 2088 may be implemented, for example, as at least a part of a power management integrated circuit (PMIC).

The battery 2089 may power at least one component of the electronic device 2001. According to an embodiment, the battery 2089 may include, for example, a primary cell not recharged, a secondary cell rechargeable, or a fuel cell.

The communication module 2090 may establish a direct (or wired) communication channel or a wireless communication channel between the electronic device 2001 and an external electronic device (e.g., the electronic device 2002, the electronic device 2004, or the server 2008) or may perform communication through the established communication channel. The communication module 2090 may include one or more communication processors which is operated independently of the processor 2020 (e.g., an application processor) and supports direct (or wired) communication or wireless communication. According to an embodiment, the communication module 2090 may include a wireless communication module 2092 (e.g., a cellular communication module, a short range wireless communication module, or a global navigation satellite system (GNSS) communication module) or a wired communication module 2094 (e.g., a local area network (LAN) communication module or a power line communication module). A corresponding communication module of such communication modules may communicate with an external electronic device over the first network 2098 (e.g., a short range communication network such as Bluetooth, Wi-Fi direct, or infrared data association (IrDA)) or the second network 2099 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other.

The wireless communication module 2092 may verify and authenticate the electronic device 2001 within a communication network, by using subscriber information stored in the subscriber identification module 2096.

The antenna module 2097 may transmit a signal or a power to the outside (e.g., an external electronic device) or may receive a signal or a power from the outside. According to an embodiment, the antenna module 2097 may include one or more antennas, and at least one antenna which is suitable for a communication scheme used in a computer network such as the first network 2098 or the second network 2099 may be selected, for example, by the communication module 2090 from the one or more antennas. The signal or power may be exchanged between the communication module 2090 and an external electronic device through the selected at least one antenna or may be received from the external electronic device through the selected at least one antenna and the communication module 2090.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 2001 and the external electronic device 2004 through the server 2008 connecting to the second network 2099. Each of the electronic devices 2002 and 2004 may be a device, the kind of which is the same as or different from a kind of the electronic device 2001. According to an embodiment, all or a part of operations to be executed in the electronic device 2001 may be executed in one or more external devices of the external electronic devices 2002, 2004, or 2008. For example, in the case where the electronic device 2001 should perform any function or service automatically or in response to a request from the user or any other device, the electronic device 2001 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 2001. The electronic device 2001 may process received result as it is or additionally, and may provide a result of the processing as at least a part of the response to the request. To this end, for example, a cloud computing, distributed computing, or client-server computing technology may be used.

According to various embodiments, an electronic device (e.g., a device 100 for recognizing an object) may include a communication interface, a dynamic vision sensor (DVS) (e.g., a DVS 132 of FIG. 2) to generate bit data for each of a plurality of image frames, based on change in illuminance, a processor (e.g., the processor 140 of FIG. 2) electrically connected with the communication interface and the DVS, and a memory electrically connected with the processor. The memory may store instructions, and the instructions may cause the processor to filter out at least a partial frame of the plurality of image frames, based on a ratio of the number of a bit value, which is included in the bit data and corresponds to each pixel, to the number of total pixels constituting each of the plurality of image frames, and recognize a shape of a surrounding object of the electronic device, based on another frame of the plurality of image frames.

According to various embodiments, the instructions may cause the processor to determine, as the at least a partial frame, an image frame, which has a ratio of '1' equal to or greater than a specified first reference value in the bit data or has a ratio of '0' equal to or greater than a specified second reference value in the bit data, of the plurality of image frames.

According to various embodiments, the instructions may cause the processor to determine, as the another frame, an image frame, which has a ratio of '1' less than the specified first reference value in the bit data or has a ratio of '0' less than the specified second reference value in the bit data, of the plurality of image frames.

According to various embodiments, the electronic device may further include a motion sensor to collect sensing information on movement of the electronic device. The instructions may cause the processor to determine the at least a partial frame, based on the sensing information.

According to various embodiments, the instructions may cause the processor to determine, as the at least a partial frame, an image frame collected for a time in which the electronic device is moved out of a specified range, of the plurality of image frames, based on the sensing information.

According to various embodiments, the instructions cause the processor to determine, as the another frame, an image frame collected for a time in which the electronic device is moved within a specified range, of the plurality of image frames, based on the sensing information.

According to various embodiments, the electronic device may further include an illuminance sensor to sense surrounding illuminance of the electronic device, and the instructions may cause the processor to determine the at least a partial frame, based on brightness information collected by the illuminance sensor.

According to various embodiments, the instructions may cause the processor to determine, as the at least a partial frame, an image frame collected for a time in which the surrounding illuminance of the electronic device is changed out of a range, of the plurality of image frames, based on the brightness information.

According to various embodiments, the instructions may cause the processor to determine, as the another frame, an image frame collected for a time in which the surrounding illuminance of the electronic device is changed within a specified range, of the plurality of image frames, based on the brightness information.

According to various embodiments, the DVS may be configured to compare illuminance of a first image frame with illuminance of a second image frame subsequent to the first image frame in unit of a pixel. The DVS may be configured to record a bit value of a first pixel constituting the second image frame, when an illuminance value of the first pixel constituting the second image frame is changed by a specified threshold value or more from an illuminance value of a second pixel, which corresponds to the first pixel, of the first image frame. The DVS may be configured to record the bit value with '1', when the illuminance value of the first pixel is increased by the threshold value or more from the illuminance value of the second pixel, and record the bit value with '0', when the illuminance value of the first pixel is decreased by the threshold value or more from the illuminance value of the second pixel. The DVS may be configured not to record coordinates and the bit value of the first pixel, when the illuminance value of the first pixel is changed by a value less than the threshold value from the illuminance value of the second pixel.

According to various embodiments, the instructions may cause the processor to control at least one of Internet of thing (IoT) device, based on the recognized shape.

According to various embodiments, the instructions may cause the processor to transmit data on the another frame to an external server through the communication interface, and to receive information on the shape from the external server.

According to various embodiments, the instructions may cause the processor to calculate an amount of bit image data collected for a specified time or an amount of bit image data of the specified number of consecutive frames, and determine the at least a partial frame, based on the amount of the bit image data.

According to various embodiments, a method for recognizing an object may be performed in an electronic device and may include collecting bit data of each of a plurality of image frames, based on change in illuminance, by using a DVS, filtering out at least a partial frame of the plurality of image frames, based on a ratio of the number of a bit value, which is included in the bit data and corresponds to each pixel, to the number of total pixels constituting each of the plurality of image frames, and recognizing a shape of a surrounding object of the electronic device, based on another frame of the plurality of image frames.

According to various embodiments, the filter out of the at least a partial frame may include determining, as the at least a partial frame, an image frame, which has a ratio of '1' equal to or greater than a specified first reference value in the bit data or has a ratio of '0' equal to or greater than a specified second reference value in the bit data, of the plurality of image frames.

According to various embodiments, the recognizing the shape of the object may include determining, as the another frame, an image frame, which has a ratio of '1' less than the specified first reference value in the bit data or has a ratio of '0' less than the specified second reference value in the bit data, of the plurality of image frames.

According to various embodiments, the collecting of the bit data may include collecting sensing information on movement of the electronic device, by using a motion sensor, and the filtering out of the at least a partial frame may include determining the at least a partial frame of the plurality of image frames, based on the sensing information.

According to various embodiments, each of components (e.g., a module or a program) may include a singular entity or a plurality of entities, may exclude a partial sub-component of the above-described sub-components, or may further include a different sub-component according to various embodiments. Substantially or additionally, partial components (e.g., modules or programs) may be integrated into one entity and may perform functions the same as or similar to functions of the components before the integration. According to various embodiments, operations performed by modules, program, or other components may be executed by a successive method, a parallel method, a repeated method, or a heuristic method, at least some operations may be executed in a difference sequence or omitted, or may include another operation added thereto.

The invention claimed is:

1. An electronic device comprising:
   a communication interface;

a dynamic vision sensor (DVS) configured to generate bit data for each of a plurality of image frames, based on a change in illuminance;
a processor electrically connected with the communication interface and the DVS; and
a memory electrically connected with the processor,
wherein the memory stores instructions, and
wherein the instructions cause the processor to:
   filter out at least a partial frame of the plurality of image frames, based on a ratio of a number of pixels of a bit value, which is included in the bit data and corresponds to each pixel of a frame of the plurality of image frames, to a number of total pixels constituting the frame; and
   recognize a shape of a surrounding object of the electronic device, based on another frame of the plurality of image frames.

2. The electronic device of claim 1, wherein the instructions further cause the processor to:
determine, as the at least a partial frame, an image frame, which has a ratio of bit values of '1' that is equal to or greater than a specified first reference value in the bit data or has a ratio of bit values of '0' that is equal to or greater than a specified second reference value in the bit data, of the plurality of image frames.

3. The electronic device of claim 2, wherein the instructions further cause the processor to:
determine, as the other frame, an image frame, which has a ratio of bit values of '1' that is less than the specified first reference value in the bit data or has a ratio of bit values of '0' that is less than the specified second reference value in the bit data, of the plurality of image frames.

4. The electronic device of claim 1, further comprising:
a motion sensor configured to collect sensing information on movement of the electronic device,
wherein the instructions further cause the processor to:
   determine the at least a partial frame, based on the sensing information.

5. The electronic device of claim 4, wherein the instructions further cause the processor to:
determine, as the at least a partial frame, an image frame collected for a time in which the electronic device is moved out of a specified range, of the plurality of image frames, based on the sensing information.

6. The electronic device of claim 4, wherein the instructions further cause the processor to:
determine, as the other frame, an image frame collected for a time in which the electronic device is moved within a specified range, of the plurality of image frames, based on the sensing information.

7. The electronic device of claim 1, further comprising:
an illuminance sensor configured to sense surrounding illuminance of the electronic device,
wherein the instructions further cause the processor to:
   determine the at least a partial frame, based on brightness information collected by the illuminance sensor.

8. The electronic device of claim 7, wherein the instructions further cause the processor to:
determine, as the at least a partial frame, an image frame collected for a time in which the surrounding illuminance of the electronic device is changed out of a range, of the plurality of image frames, based on the brightness information.

9. The electronic device of claim 7, wherein the instructions further cause the processor to:
determine, as the other frame, an image frame collected for a time in which the surrounding illuminance of the electronic device is changed within a specified range, of the plurality of image frames, based on the brightness information.

10. The electronic device of claim 1, wherein the DVS is further configured to:
compare illuminance of a first image frame with illuminance of a second image frame subsequent to the first image frame in a unit of a pixel.

11. The electronic device of claim 10, wherein the DVS is further configured to:
record a bit value of a first pixel constituting the second image frame, when an illuminance value of the first pixel constituting the second image frame is changed by a specified threshold value or more from an illuminance value of a second pixel, which corresponds to the first pixel, of the first image frame.

12. The electronic device of claim 11, wherein the DVS is further configured to:
record the bit value of the first pixel as '1', when the illuminance value of the first pixel is increased by the specified threshold value or more from the illuminance value of the second pixel, and
record the bit value of the first pixel as '0', when the illuminance value of the first pixel is decreased by the specified threshold value or more from the illuminance value of the second pixel.

13. The electronic device of claim 11, wherein the DVS is further configured not to:
record coordinates and the bit value of the first pixel, when the illuminance value of the first pixel is changed by a value less than the specified threshold value from the illuminance value of the second pixel.

14. The electronic device of claim 1, wherein the instructions further cause the processor to:
calculate an amount of bit image data collected for a specified time or an amount of bit image data of a specified number of consecutive frames, and
determine the at least a partial frame, based on the amount of the bit image data.

15. A method for recognizing an object, which is performed in an electronic device, the method comprising:
collecting bit data of each of a plurality of image frames, based on a change in illuminance, by using a dynamic vision sensor (DVS);
filtering out at least a partial frame of the plurality of image frames, based on a ratio of a number of pixels of a bit value, which is included in the bit data and corresponds to each pixel of a frame of the plurality of image frames, to a number of total pixels constituting the frame; and
recognizing a shape of a surrounding object of the electronic device, based on another frame of the plurality of image frames.

* * * * *